Patented Jan. 20, 1931

1,789,507

UNITED STATES PATENT OFFICE

CHRISTIANUS JOSEPHUS GODEFRIDUS AARTS, OF VOORBURG, NETHERLANDS

PROCESS OF MAKING AN ADSORBENT COMPRISING CARBON, IRON, AND IRON OXIDE

No Drawing. Application filed March 13, 1929, Serial No. 346,816, and in the Netherlands March 22, 1928.

This invention relates to the manufacture of a product having very strong adsorbent properties, consisting of a mixture of carbon, iron and iron oxide.

The invention consists in conducting a gas containing CO through and over finely divided iron oxide, at a temperature at which the iron oxide is reduced for a large part but by no means entirely, and in which the mixture formed of iron and iron oxides serves as an oxygen-carrier, whereby one mol. CO is oxidized at the expense of another, so that, on the one hand, carbon is separated and $CO_2$ is formed, and, on the other hand, the iron or iron oxide is alternatively oxidized and reduced, or reduced and oxidized, respectively, and therefore takes an active part in the reaction and as such is also present in the final product.

What occurs may probably be expressed as follows:

The first reaction, which occurs quickly and is not reversible, is $$3Fe_2O_3 + CO = 2Fe_3O_4 + CO_2 \quad (1)$$

Then appears:

$$Fe_3O_4 + CO \rightleftharpoons 3FeO + CO_2 \quad (2)$$

At a determined temperature, for example 375° C., this equilibrium will be possible with a determined relation between $CO_2$ and CO.

If the concentration of CO is too large, then the $Fe_3O_4$ will be entirely reduced and the reaction appears:

$$FeO + CO \rightleftharpoons Fe + CO_2 \quad (3)$$

Here also the equilibrium depends on the proportion between CO and $CO_2$.

When leading a gas rich in CO over iron oxide, the Reactions (2) and (3) will appear immediately and if nothing further happens these will proceed entirely as represented from left to right, on account of the continuous supply of fresh CO, until all iron oxides were reduced. The CO would then pass unchanged.

The following reactions, however, now appear:

$$Fe + CO = C + FeO \quad (4)$$

and possibly $$3FeO + CO = C + Fe_3O_4 \quad (5)$$

The reactions are practically not reversible at the prevailing temperature, so that there are also obtained:

$$FeO + CO = Fe + CO_2 \quad (3)$$
$$Fe + CO = FeO + C \quad (4)$$

that is, re-formation of FeO and re-appearance of (3).

The sum of these reactions is $$2CO = CO_2 + C.$$

The result is, that with the continuous passage of CO over the iron and iron oxide, $CO_2$ continues to be formed and a certain relation in the gas between $CO_2$ and CO will appear, which is dependent on the reaction-speeds of Reactions (3) and (4).

If the content of $CO_2$ is relatively high, then Reaction (2) and probably Reaction (5) can now appear also, the sum of which again gives $2CO = CO_2 + C$, and thus a balance can be formed between all appearing reactions.

The mixture of iron and iron oxide thus works apparently catalytically; but that there is no real catalysis here, appears from the fact that the conversion $2CO \rightleftharpoons CO_2 + C$ never occurs until the equilibrium of this reaction is attained but, even with the slowest gas stream, remains at a relation between CO and $CO_2$ corresponding with the iron equilibrium at the prevailing temperature and pressure.

On the other hand this equilibrium is already attained at considerable gas speeds and appears little dependent on the gas speed when there is sufficient contact of the gases with the finely divided contact mass. Practically 45–65 per cent of $CO_2$ can be obtained in the finished gases. This regular content also proves that there is no question here of a proper catalysis.

The temperature region in which the reaction occurs satisfactorily is fairly narrowly limited between 350 and 450° C. and is of course also dependent on the CO and $CO_2$ concentration in the gases used.

Where iron or iron oxide takes an essential part in the reaction, it is clear that the carbon formed is formed in very close connection with the iron, and further that the reaction proceeds more completely and more easily according as the iron oxide is more easily and better accessible to the gas. Now the carbon formed itself renders the contact between the iron matter and the gas more and more difficult, and as the formation of carbon increases, the reaction becomes slower and more incomplete.

It has been found that there is no danger of poisoning the contact matter which, in other cases, namely with real catalysis, is always a source of great difficulty in catalytic reactions.

Even unpurified generator gas can be used and no special attention need be paid to the purification of the gas for carrying out the process on a large scale. Also other gases containing CO can be used, such as water gas.

When a temperature satisfactory for the Fe—C—O equilibrium can easily be maintained, the greatest difficulty is to provide a sufficient, even abundant, contact between the gas phase and the contact matter consisting of iron and iron oxide. For this reason the contact mass is finely distributed over voluminous carriers containing carbon. By starting with such carriers no foreign matter is brought into the final product. By the separation of carbon the particles grow regularly and agglomerates are formed which can be pulverized for different purposes.

In this way a product can be obtained containing about 85 percent of carbon, and in the finished gases a conversion of 60–65 per cent of the CO can be attained.

The presence of water vapor in the gas, however, is injurious, as then hydrocarbons are formed and the yield of carbon diminishes and the qualities of the product are not so good. The presence of hydrogen, on the other hand, is not appreciably injurious.

The contact matter required for the reaction can profitably be obtained by distributing an aqueous suspension of finely divided iron oxide or hydroxide over solid material containing carbon, such as charcoal, wood-wool, hay or the like, and drying the suspension thereon. When the gases are passed over such organic carriers, the latter are charred, but the fine distribution of the iron contact remains.

The following example illustrates the invention:

The reaction vessel is charged with wood-wool, which has been soaked in an aqueous suspension of iron oxide. The strength of this suspension may be chosen within very wide limits and depends somewhat on the nature of the wood-wool, which in its turn depends on the dimensions of the reaction vessel and must be of such a firmness that the charcoal skeleton formed therefrom is sufficiently strong in itself to remain standing in the vessel.

Preferably the quantity of wood-wool used is as small as practicable, in order that there may be as little charcoal as possible under the carbon separated by the reaction. An iron oxide suspension of 20–40 per cent strength has proved to be suitable in most cases.

The speed with which the gas may be led through the mass at the required temperature is particularly dependent on the dimensions of the vessel and is controlled in such a way that the duration of the contact of the gas with the filling material (wood-wool soaked in iron oxide) amounts to about 20–50 seconds (calculated for cold gas), and that this duration increases as the carbon separation proceeds. In this way a content of about 60 per cent of $CO_2$ (per cent of total volume of $CO + CO_2$) can be obtained in the final gas.

For the industrial application it is desirable to conduct the reaction in a number of reaction vessels in series, so that the last vessel, charged with fresh wood-wool, is traversed by spent hot gases, and the distillation products of the wood-wool are discharged with these gases before the separation of active carbon begins. In this way the quality of the active carbon is not unfavourably influenced by the distillation products of the wood-wool.

The reaction can be continued in the above-mentioned manner until the final product contains 80–90 per cent of carbon. From the mode of preparing the product, it follows that the latter must be a very intimate mixture of carbon, iron and iron oxide.

No success has attended efforts to separate the components by physical methods.

Separation by means of a magnet, whether a direct current magnet or an alternating current magnet, was not achieved; the only perceptible result was a general weakening of the magnetic permeability, without, however, any appreciable selective action.

Separation was also tried by means of a classifying apparatus through which an aqueous suspension of the product was slowly led. In this case the separation would be based on the great difference in specific gravity of the components. But in this case, also, not even a gradual purification was obtained. There was no considerable difference between the purity of the first and of the last sample.

Furthermore it was tried in vain to effect a magnetic separation in an aqueous suspension. Also, in an alkaline suspension no result was obtained.

From the negative result of all these experiments it appears that the product is a very homogeneous and exceedingly finely divided mixture, the separation of which into its components with the aid of mere physical means involves great difficulties. This homogeneous and exceedingly fine division of the contact matter in the product was found also in numerous incineration experiments. An explanation for this close connection of the components follows from the reaction itself, in which every molecule of carbon that is formed requires immediate contact with an iron molecule and is therefore amalgamated with the latter in the most intimate way.

Only by chemical methods a separation of the components and preparation of a more or less pure carbon has been found possible.

For most uses, however, it is not essential to separate the product and prepare pure carbon from it; the mere mixture, just as it is obtained, offers practical advantages.

The chief application of the product is as an adsorbent. It has the qualities of an active carbon and can be used for instance for the decolorizing of organic liquids, such as sugar juices. For this use it is desirable to produce the maximum carbon content.

On the other hand, the iron content of the product has the advantage that the whole mass can be separated magnetically, and the filtration of the adsorbent from the solution is thereby made easier.

The product can also be used as a pigment. After pulverizing, it constitutes a very good black pigment for the preparation of blacking, India ink, or the like.

A further application of the product is as a carburizing agent. In some metallurgical processes it is desirable to restore to iron the carbon which has been oxidized during the refining operation, by means of a carbon, free from sulphur, phosphorus and other such deleterious components. Forms of the product which are relatively rich in Fe lend themselves especially hereto, since the iron acts favourably by promoting the mixing.

The product also lends itself admirably to the making of electrodes for electric furnaces, since the iron content is variable and is homogeneously distributed through the mass. Thus a solid electrode with high conductive capacity is obtained.

Still another important use is as a filler in the manufacture of rubber articles. In this case it shows properties similar to those of the carbon black now generally in use.

What I claim is:

1. A process of making a product possessing very intense adsorbent properties and consisting of a mixture of carbon, iron and iron oxide, comprising the steps of distributing finely-divided iron oxide over a voluminous carbonaceous carrier filling substantially the entire reaction room; and passing a gas containing carbon monoxide through the carrier so treated at a temperature at which the iron oxide is reduced for a large part but not exclusively.

2. A process according to claim 1, in which the gas containing carbon monoxide is practically free from water vapour.

3. A process according to claim 1, in which the carrier comprises wood-wool, and the iron oxide is distributed thereover in aqueous suspension and dried therewith.

4. A process according to claim 1, in which the iron oxide is distributed over the carrier in aqueous suspension and dried therewith.

5. A process of making a product possessing very intense adsorbent properties and consisting of a mixture of carbon, iron and iron oxide, comprising the steps of distributing finely-divided iron oxide over a voluminous carbonaceous carrier filling substantially the entire reaction room; and passing a gas containing carbon monoxide through the carrier so treated at a temperature between 350–450° C.

6. A process according to claim 5, in which the finished gas contains 45–65% $CO_2$ of the total volume of $CO + CO_2$ in the gases.

7. A process according to claim 1, in which the gas containing carbon monoxide is passed over the carrier until a physically-inseparable mixture of iron, iron oxide and carbon is obtained containing more than 80% of carbon.

CHRISTIANUS JOSEPHUS GODEFRIDUS AARTS.